US006814413B2

(12) United States Patent
Davison et al.

(10) Patent No.: US 6,814,413 B2
(45) Date of Patent: Nov. 9, 2004

(54) HYDRAULIC BRAKE AND STEERING ASSIST SYSTEM

(75) Inventors: James Leroy Davison, Freeland, MI (US); Henry George Bean, Saginaw, MI (US); Johnny M. Paris, Clio, MI (US); Michael Alan Johnson, Flushing, MI (US)

(73) Assignee: Delphi Technologies, Inc., Troy, MI (US)

( * ) Notice: Subject to any disclaimer, the term of this patent is extended or adjusted under 35 U.S.C. 154(b) by 7 days.

(21) Appl. No.: 10/156,628

(22) Filed: May 28, 2002

(65) Prior Publication Data

US 2002/0180258 A1 Dec. 5, 2002

Related U.S. Application Data

(60) Provisional application No. 60/294,893, filed on May 31, 2001.

(51) Int. Cl.[7] ................................................ B60T 8/44
(52) U.S. Cl. ...................... 303/114.1; 303/146; 180/6.3
(58) Field of Search .................... 303/10, 11, 114.1, 303/113.3, 115.4, 115.5, 116.1, 117.1, 146; 180/6.3, 441

(56) References Cited

U.S. PATENT DOCUMENTS

| 4,106,818 A | * | 8/1978 | Fiala | 303/11 |
|---|---|---|---|---|
| 4,620,750 A | * | 11/1986 | Leiber | 303/113.4 |
| 4,967,643 A | * | 11/1990 | Siegel | 91/369.1 |
| 6,343,469 B1 | * | 2/2002 | Penninger et al. | 60/422 |
| 6,422,661 B1 | | 7/2002 | Shaw et al. | |
| 6,434,931 B1 | | 8/2002 | Shaw et al. | |
| 6,533,369 B2 | | 3/2003 | Baumgartner et al. | |

FOREIGN PATENT DOCUMENTS

| DE | 2504712 A | * | 8/1976 | .......... B60G/11/26 |

* cited by examiner

*Primary Examiner*—Matthew C. Graham
*Assistant Examiner*—Xuan Lan Nguyen
(74) *Attorney, Agent, or Firm*—Michael D. Smith

(57) ABSTRACT

An improved hydraulically assisted braking and steering system of a vehicle having a hydraulic pump communicating with a hydraulic steering assist device and including a hydraulic brake assist device coupled in series between the pump and the steering assist device includes the provision of a flow splitter which operates to reduce the interdependence of the hydraulic brake and steering assist devices on the flow of fluid from the pump. The flow splitter communicates with the outlet of the pump and the inlet of the brake assist device and is operative when the back pressure from the brake assist device exceeds a predetermined control value to divert a fraction of the flow of fluid around the brake assist device directly to the steering assist device, thereby providing sufficient flow to operate both the brake and steering assist devices within their normal design limits, rather than having the brake assist device starve the steering assist device when under heavy load.

11 Claims, 3 Drawing Sheets

HYDRAULIC BRAKE AND STEERING ASSIST SYSTEM

The disclosure incorporates the hydraulic brake and steering assist system disclosed in provisional application No. 60/294,893, filed May 31, 2001, whose priority is claimed for this application.

BACKGROUND OF THE INVENTION

1. Technical Field

This invention relates to hydraulic braking and steering systems, particularly those that incorporate a hydraulically boosted assist mechanism for the braking system in line with the hydraulic steering assist system.

2. Related Art

Many trucks with hydraulic braking systems incorporate hydraulic braking assist systems, rather than vacuum assist systems, particularly larger gasoline powered and diesel powered trucks. Such hydraulic braking assist systems are well known and sold commercially (e.g. the Hydro-Boost™ system sold by Robert Bosch Corporation). Details concerning the construction and operation of such brake assist systems are shown, for example, in U.S. Pat. Nos. 4,620,750 and 4,967,643. Generally, these hydraulic braking assist systems are connected in series between the steering gear and hydraulic pump and use flow from the pump to generate the necessary backpressure to provide brake assist as needed. The flow from the pump is constant. Because of the series arrangement, the application of the brakes and engagement of the hydraulic braking assist system can affect the flow of hydraulic fluid to the steering gear, thereby affecting the amount of assist applied to the steering gear by the hydraulic steering gear assist system. Specifically, when a heavy braking load is applied, it causes an increase in backpressure to the pump which can exceed a threshold relief pressure (e.g., 1,500 psi) of the pump. Above this level, a bypass valve of the pump opens to divert a fraction of the outflow back to the intake of the pump, where the cycle continues until the backpressure from the brake assist device drops below the threshold valve. During this relief condition, a diminished flow of fluid is sent to the steering gear which may result in a detectable increase in steering effort by the operator of the vehicle to turn the steering wheel under extreme relief conditions.

It is an object of the present invention to modify the flow characteristics of such hydraulic brake and steering assist systems to avoid depleting the flow of fluid to the steering assist device under heavy braking conditions in order to maintain a generally constant steering effort of the steering wheel, irrespective of the backpressure to the pump exerted by the brake assist device. The invention thus aims to eliminate or greatly minimize any noticeable change in steering effort on the part of the operator under heavy braking conditions.

SUMMARY OF THE INVENTION

This invention comprises an improved hydraulic system for a vehicle comprising a hydraulic pump, a hydraulic braking assist system and a hydraulic steering gear assist system, whereby the discharge flow from the hydraulic pump is split between the steering gear assist system and the hydraulic braking assist system by a flow splitting means that is connected to both the hydraulic braking assist system and the hydraulic steering gear assist system and that is adapted to provide and control the flow of hydraulic fluid to both of these systems, thereby controlling the interdependence of these systems. This flow splitting means has a sensing means to sense the brake assist pressure of the fluid fed to the hydraulic braking assist system. As the hydraulic braking assist system is activated, the brake assist pressure at the sensing means increases. At a control pressure, preferably a pressure just below the relief pressure of the hydraulic pump, the flow splitter will shunt or bypass a portion of the flow around the hydraulic braking assist system directly to the steering gear assist system, thereby providing sufficient flow to operate both systems within normal design limits. The control pressure in the flow splitter may be fixed or variable. Systems which sense pressure and vary the flow of fluid, for example electronic pressure control valves, are well known, and could be adapted to vary the flow in the present invention.

The flow splitter means can be located in line at any convenient location between the pump and the hydraulic braking assist system, and is operative to divert a fraction of the flow of hydraulic fluid issued from the pump to the hydraulic steering gear assist system, as needed, depending upon the line pressure to the hydraulic braking assist system.

The invention further contemplates such an improved hydraulic system in which the sensing means further senses the steering assist pressure of the fluid fed to the hydraulic steering assist mechanism. At a second control pressure, preferably about the same as that associated with the brake assist system, the flow splitter operates to supply the required flow to operate the brake and steering assist mechanisms while shunting or bypassing an excess fraction of the available incoming flow from the pump around the steering and brake assist systems to another location in the system, preferably a fluid reservoir. The invention thus provides a sensing means with a double relief feature that operates to relieve both the braking and steering assist systems at preferably about the same control pressure, enabling a single flow control device to be used to control the relief of both the braking and steering assist systems. Such simplifies the overall design of the hydraulic system, requires fewer components and less space, and is less expensive to implement than a separate flow control device for each of the braking and steering assist systems.

The invention further contemplates such an improved hydraulic system in which the flow rate of fluid fed to the flow splitting means by the pump exceeds the flow rate required to operate the hydraulic brake assist system, and whereby the flow splitting means is operative to constantly bleed a portion of the incoming flow directly to the steering assist mechanism.

Preferably, the diversion of fluid is achieved by choking the flow port to the brake assist system in a manner that still provides the required flow rate of fluid to both the brake and steering assist systems. Under normal operating conditions, the brake assist system requires a lesser flow rate of hydraulic than that of the steering assist system, and thus the flow to the brake assist system can be choked to provide non-uniform flow matching the different flow requirements of each system. Supplying the steering assist system with a relatively greater flow under normal operating conditions has the advantage of minimizing any noticeable increase in steering effort under a condition of hard, sudden braking where a momentary spike in the flow requirement of the braking assist system occurs. With a constant bleed of fluid to the steering assist system, the needed fluid to operate the steering assist mechanism under such sudden braking condition is already present. The choke control to provide a constant bleed of fluid to the steering assist system has the further advantage of prepositioning the sensing means closer to the relief condition, whereby the flow splitting means can react more quickly to divert a fraction of flow to the steering assist mechanism when the brake assist pressure reaches the control pressure. Such provides for a smoother transition between the various operating conditions and further minimizes any change in steering effort detected by an operator of a vehicle during such transitions.

BRIEF DESCRIPTION OF THE DRAWINGS

These and other features and advantages of the present invention will become more readily appreciated when considered in connection with the following detailed description and appended drawings, wherein.

DETAILED DESCRIPTION OF PREFERRED EMBODIMENT

Figure 1:
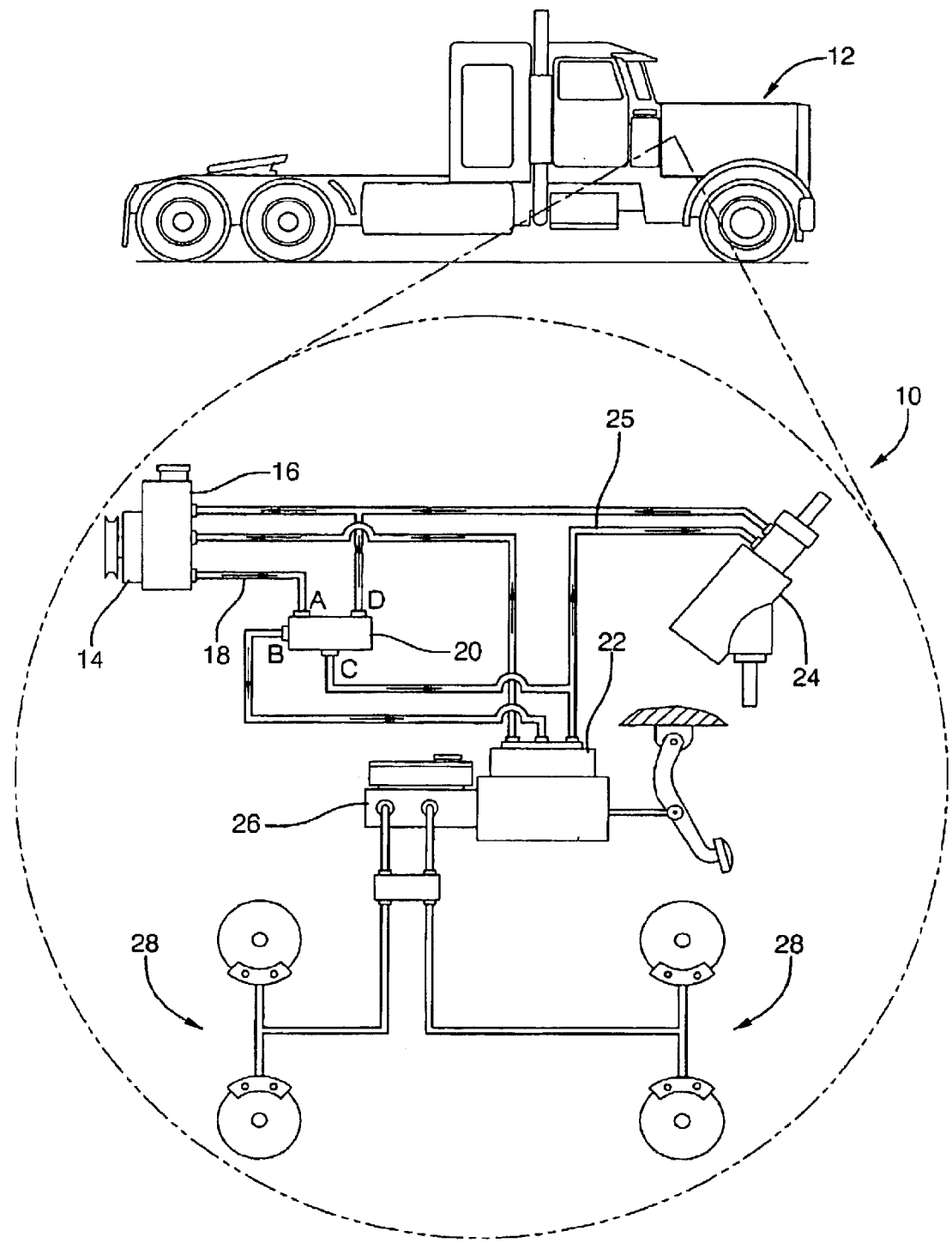
FIG. 1 is a schematic view illustrating the hydraulic system of an embodiment of the invention.

FIG. 1 shows a hydraulic system 10 for a vehicle 12 for assisting in the steering and braking of the vehicle. The hydraulic system includes a hydraulic pump 14 and reservoir 16. The reservoir may be incorporated into the pump 14, as illustrated, or may be located remote from the pump 14.

The pump 14 delivers high pressure hydraulic fluid through discharge line 18 to a flow control splitter means or device or flow splitter 20. The flow splitter 20, in turn, selectively communicates with a hydraulic braking assist system or booster device 22, a hydraulic steering gear assist system or device 24, and the reservoir 16, depending on predetermined operating conditions of the system 10, as will be explained below. The hydraulic brake assist 22 communicates with a master cylinder 26 and brakes 28 of the braking system and further with the steering assist device 24 through line 25.

The hydraulic booster device 22 is of the type well known to the art which is disposed in line between the hydraulic pump and the hydraulic master cylinder of a vehicles hydraulic brake system which acts to boost or amplify the fluid pressure of the hydraulic fluid supplied by the pump to the brake circuit in order to reduce brake pedal effort and pedal travel required to apply the brakes as compared with a manual braking system. Such systems are disclosed, for example, in U.S. Pat. Nos. 4,620,750 and 4,967,643 as examples of a suitable booster device 22, the disclosure of which are incorporated herein by reference. Briefly, hydraulic fluid from the supply pump 14 is communicated to the booster device 22 through a booster inlet port and is directed through an open center spool valve slideable in a booster cavity (not shown). A power piston slides within an adjacent cylinder and is exposed to a fluid pressure on an input side of the piston and coupled to an output rod on the opposite side. An input reaction rod connected to the brake pedal extends into the housing and is linked to the spool valve via input levers or links. Movement of the input rod moves the spool valve, creating a restriction to the fluid flow and corresponding boost in pressure applied to the power piston. Steering pressure created by the steering gear assist system 24 is isolated from the boost cavity by the spool valve and does not affect braking but does create a steering assist backpressure to the pump 14. The flow splitter 20 according to the invention operates to manage the flow of hydraulic fluid from the pump 14 to each of the brake assist 22 and steering assist 24 systems in a manner that reduces the interdependence of the steering and braking systems on one another for operation.

With reference to FIGS. 2–5, the flow splitter 20 includes a valve body 30 having a valve bore 32 in which a slideable flow control valve 34 is accommodated. A plurality of ports are provided in the valve body 30, and are denoted in the drawing Figures as ports A, B, C and D. Fluid from the pump 14 is directed into the valve body 30 through port A, where it enters the chamber 32 and is directed out of the body 30 through one or more of the outlet ports B, C and D, depending upon the operating conditions which will now be described.

Figure 2:
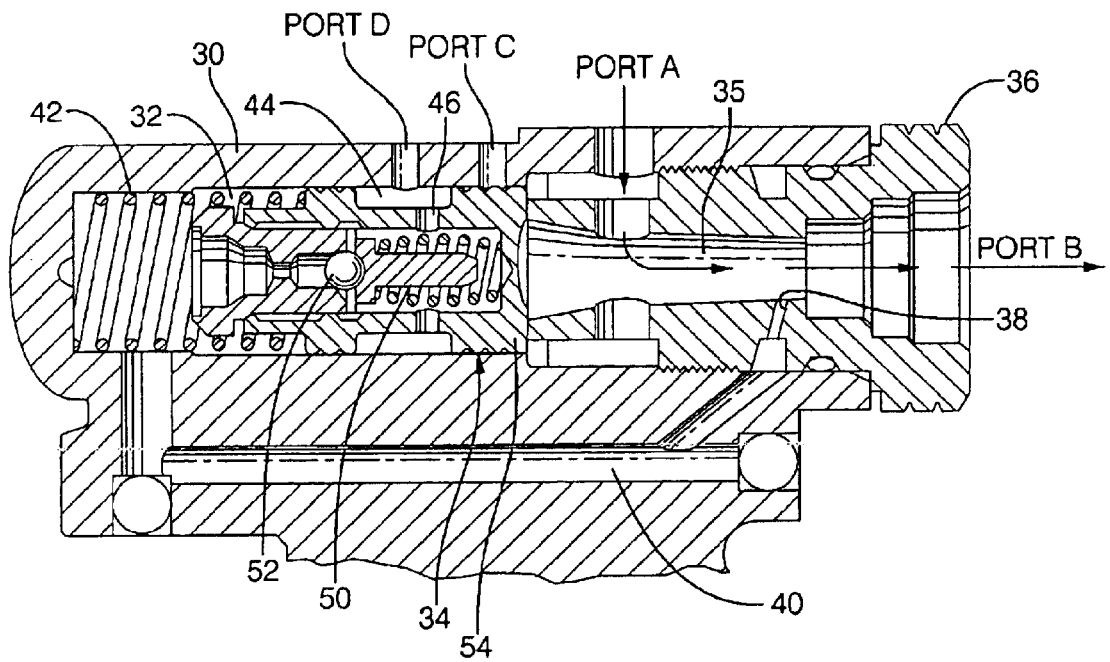
FIG. 2 is a fragmentary cross-sectional view of the flow control splitter shown in use under normal flow conditions.

FIG. 2 shows normal operation of the flow splitter under conditions where backpressure from the brake assist device 22 and the backpressure from the steering assist device 24 are below predetermined control pressures. All of the flow entering port A passes through a primary channel 35 of the bore 32 of the flow splitter 20 and is routed through port B to the hydraulic brake booster 22.

In the condition illustrated in FIG. 2, both the brake assist 22 and steering assist 24 are operating below the predetermined control or relief pressure and the fluid flows freely into port A and out port B through the channel 35. As shown, the valve body 30 may be fitted with a union fitting 36 which extends into the valve bore 32 and is formed with the primary channel 35 in direct flow communication with the valve bore 32. The line pressure in the primary channel 35 is communicated through a P-hole orifice 38 of the fitting 36 and a communication passage 40 in the valve body 30 to the back of the flow control valve 34. This pressure, along with pressure from a flow control spring 42 holds the valve 34 forward against the union fitting 36. In this position, the valve 34 completely covers the bypass ports C, D to the steering assist 24 and reservoir 16, respectively, such that flow neither enters nor leaves these two ports. The valve 34 has a reservoir pressure communication groove 44 that is always exposed to port D and thus to the reservoir pressure regardless of what position the valve 34 is in. This reservoir pressure is communicated to the inside of the valve through opening 46 at all times. A small poppet valve 50 separates the line pressure from behind the flow control valve 34 to the reservoir pressure inside the valve 34 communicating with opening 46.

Figure 3:
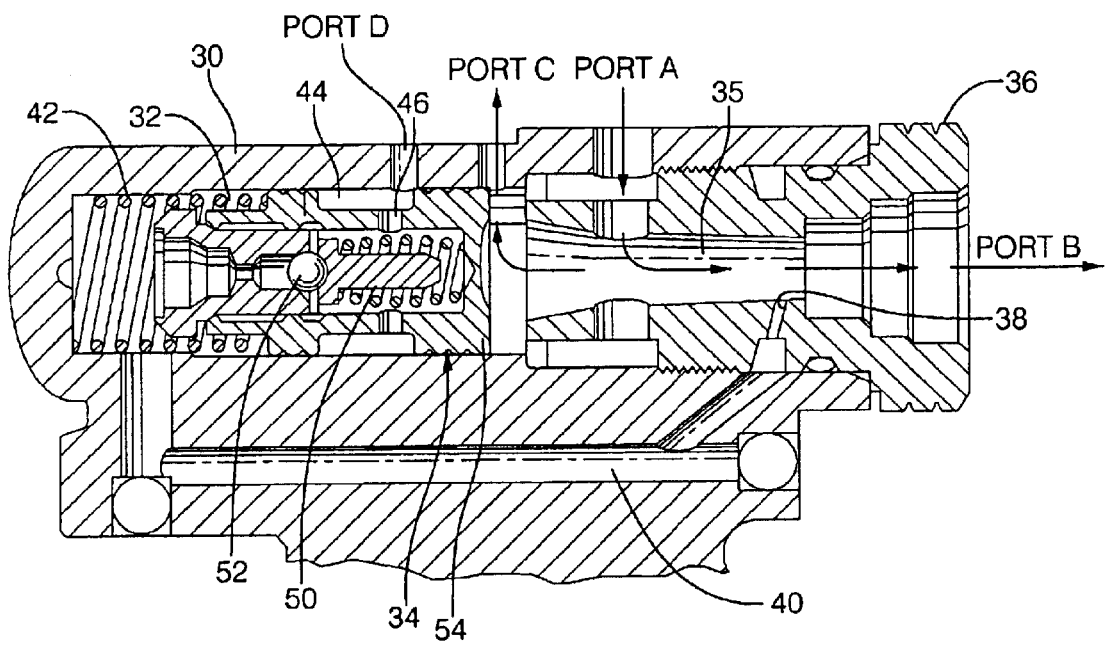
FIG. 3 is a view like FIG. 2 shown in a condition where the brake assist pressure has reached a control pressure causing a diversion of flow to the gear assist.

Turning now to FIG. 3, the condition is shown where the brake assist pressure developed by the brake assist device 22 within port B and the primary channel 35 exceeds the predetermined control pressure for the brake assist device 22, which is preferably set just below the relief pressure of the pump 14. As the backpressure in primary channel 35 approaches the predetermined control pressure, the fluid pressure communicated to the back side of the flow control valve 34 will unseat a poppet ball 52 of the poppet valve 50 which will cause some of the hydraulic oil to bleed behind the plunger 54 of the valve 34 and out to the reservoir 16 through opening 46 and port D. Since the P-hole orifice 38 is quite small, the communication passage pressure 40 will be lower than the line pressure within the primary channel 35 as long as the poppet valve 50 is bleeding out oil from behind the plunger 54. This pressure differential will cause the plunger 54 to slide back against the spring 42 from the position shown in FIG. 2 to the position shown in FIG. 3, thereby exposing the gear bypass hole corresponding to port C to the main flow of the pump 14 coming in through port A. The flow from the pump 14 in through port A will thus be fed to both port B and port C with the excess flow attributed by the excessive backpressure being delivered directly to the steering assist device 24 through port C, bypassing the brake assist device 22. The flow control valve 34 thus operates to automatically meter excess oil flow through the gear bypass hole port C to prevent the line pressure to the brake assist device 22 from rising above the preset control pressure which, as mentioned, is preferably set just under the relief pressure of the pump 14.

Figure 4:
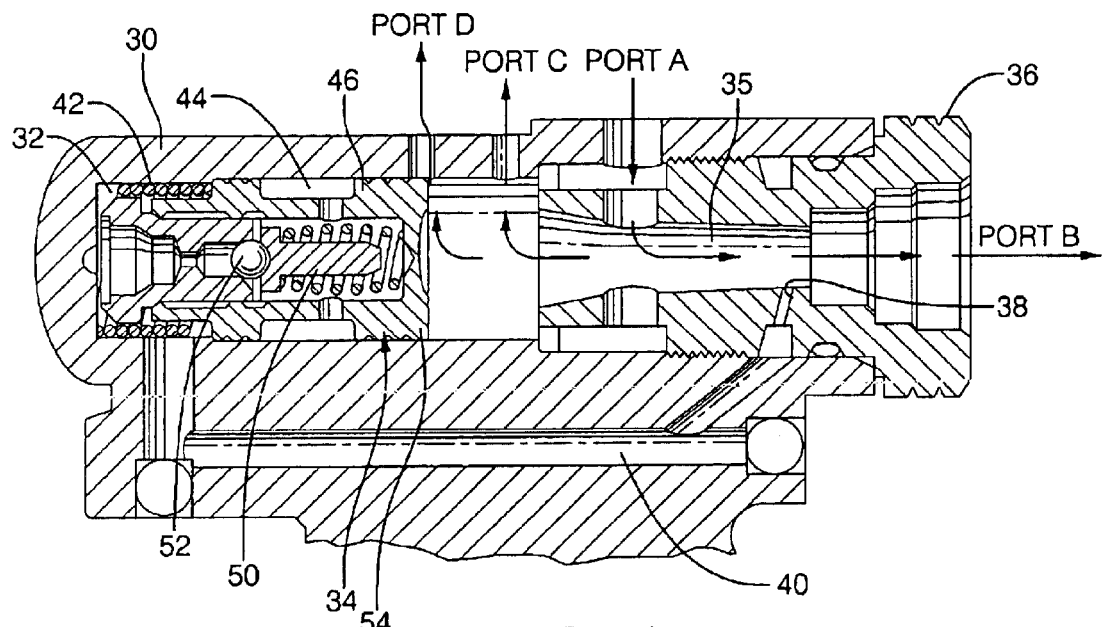
FIG. 4 is a view like FIG. 2 shown in a condition where the steering assist pressure has reached a control pressure causing a diversion of flow to the reservoir.

Turning now to FIG. 4, the condition is shown where the flow splitter 20 operates to provide relief to both the brake assist 22 and steering assist 24 devices. In this condition, the line pressure at port C leading to the steering assist device 24 has risen to a predetermined control pressure representing an upper limit of desired backpressure from the steering assist device 24. This control pressure associated with the steering assist device 24 is preferably about the same as that of the brake assist device 22, such that the single flow splitter device 20 can operate to relieve both the brake assist and steering assist devices 22,24 via the same valve bore 32 and flow control valve 34. Thus, within a few psi, the pressure of fluid fed through ports B and C can be maintained at about the same pressure under a dual relief condition where the steering assist device 24 develops excessive backpressure under heavy loading during steering. As the line pressure backing up in port C increases, the imbalance on the flow control valve 34 causes the plunger 54 to slide further back against the spring 46 to the position shown in FIG. 4, exposing the reservoir bypass hole of port D to the main flow of the pump coming in through pump A. In this manner, the valve 34 will automatically meter enough oil through the reservoir bypass port D to prevent the pressure in ports B and C from rising above the preset control pressure. Because the further rearward movement of the plunger 54 requires further compression of the spring 42, the control pressure in port C might be slightly greater than that of port B, but practically equal in relation to the operating pressures of the brake assist and steering assist devices for example, the control pressure of the brake assist device 22 may be set at 1,500 psi, whereas, due to the required compression of the spring 42, the control pressure in port C may be 1,502 psi (in other words, both are about 1,500 psi).

Figure 5:
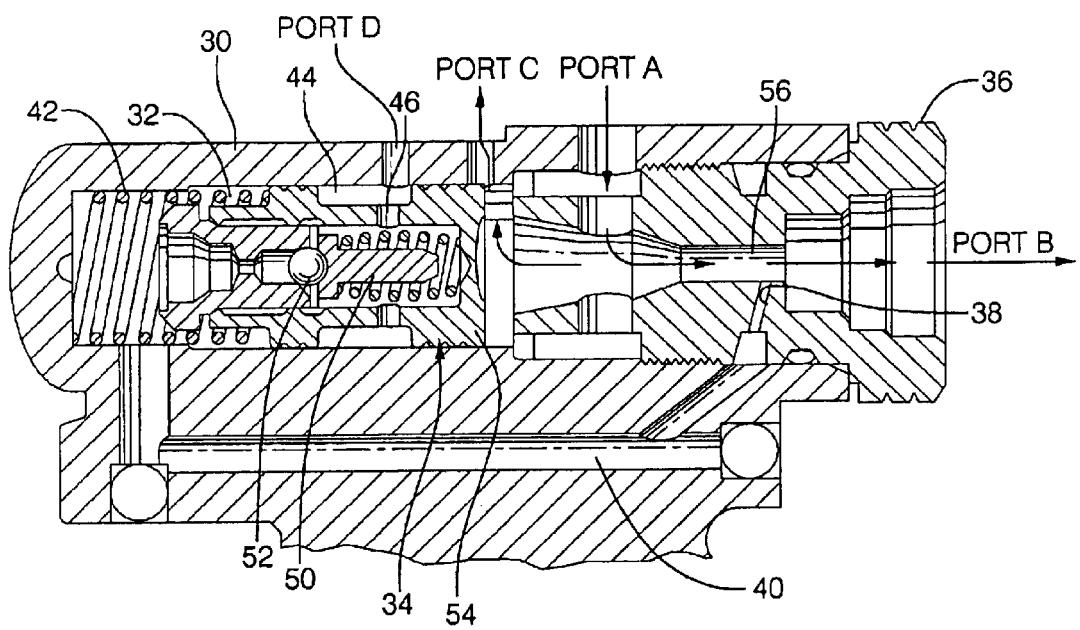
FIG. 5 is a view like FIG. 2 but showing an alternative choke control of the brake assist flow to achieve a constant bleed of flow to the steering assist device.

Turning now to FIG. 5, the same flow splitter 20 is shown with a slightly modified primary channel 35. In comparison to FIG. 2, the channel 35 of FIG. 5 is constructed so as to choke the flow of fluid to port B. This constriction reduces the flow rate to port B and correspondingly increases the line pressure. As such, under normal operating conditions as those described in connection with FIG. 2, the restriction 56 causes an increase in the line pressure in the primary channel 56 sufficient to cause the plunger 54 to slide rearwardly and open the bypass hole of port C by a slight amount, such that a fraction of the incoming flow from the pump 14 in through port A is always diverted or bypassed through port C to the steering assist device 24 under normal operating conditions. In other words, the restriction 56 has the effect of reducing the flow rate (for example, from 3.5 gallons per minute to 2.0 gallons per minute out through port B to the brake assist device 22 which operates under normal conditions at the control pressure, with the balance of the flow (e.g., 1.5 gallons per minute) being continuously fed through the slightly open port C leading to the steering assist device 24.

The restriction 56 can be engineered to supply the brake assist device 22 with just the right amount of flow needed to operate the device under all conditions, with the excess being fed to the steering assist device 24 which typically requires a greater flow rate of fluid than that needed by the brake assist device 22.

It will be appreciated that the arrangement of FIG. 5 has the benefit of prepositioning the plunger 54 in a position closer to full relief, such that when a sudden increase in backpressure is seen in port B, the plunger 54 can quickly slide back to fully open port C for a quicker diversion of fluid to the steering assist device 24. This arrangement has the further advantage of constantly supplying a flow of excess fluid to the steering assist device 24 which is not needed by the brake assist device 22. In a sudden hard braking condition, this excess fluid helps reduce the effect of any momentary shortage of supply to the steering assist device such that the operator will see no or minimal effect in change in steering effort under such conditions.

The disclosed embodiments are representative of presently preferred forms of the invention, but are intended to be illustrative rather than definitive thereof. The invention is defined by the claims.

What is claimed is:

1. In a hydraulically assisted braking and steering system of a vehicle having a hydraulic pump communicating with a hydraulic steering assist device and including a hydraulic brake assist device coupled in series between the pump and the hydraulic steering assist device such that a primary supply of hydraulic fluid fed to the hydraulic steering assist device for its operation passes first through the hydraulic brake assist device, and wherein the improvement comprises:

a flow splitter disposed in series between the pump and the hydraulic brake assist device and communicating directly with the steering assist device, said flow splitter being operative to sense brake assist pressure of fluid fed by the pump to the hydraulic brake assist device and in response to sensing that the brake assist pressure has reached a predetermined brake assist control pressure which would result in a sudden, temporary drop of the primary supply of fluid to the hydraulic steering assist device, being further operative to direct a supplemental supply of bypass fluid around the hydraulic assist device directly to the hydraulic steering assist device to counteract the drop in the primary supply and thereby minimize any change in steering effort felt by an operator of the vehicle during sudden hard braking conditions.

2. The system of claim 1 wherein said flow splitter includes a valve body and a valve member disposed in said valve body.

3. The system of claim 2 wherein said valve body includes an inlet for receiving fluid from the pump, a first outlet port communicating with an inlet to the hydraulic brake assist device; a second outlet port communicating with the hydraulic steering assist device; and a third outlet port communicating with a fluid reservoir.

4. The system of claim 3 wherein said valve is moveable within said valve body in response to said flow splitter sensing that the brake assist pressure has reached the predetermined brake assist control pressure to a position to open flow communication between said inlet port, said first outlet port, and said second outlet port to divert the fraction of the fluid to the hydraulic steering assist device.

5. The system of claim 1 wherein the predetermined brake assist control pressure is below a predetermined relief pressure of the pump.

6. The system of claim 4 wherein said flow splitter is operative to sense steering assist pressure of fluid fed to the steering assist device and in response to sensing that the steering assist pressure has reached a predetermined steering assist control pressure, being further operative to divert a fraction of the fluid from the pump to other than the brake and steering assist devices.

7. The system of claim 6 wherein in response to sensing the predetermined steering assist control pressure, said valve is further moveable to open flow communication between said inlet port and said first, second and third outlet ports to divert said fraction of flow to said third outlet port.

8. The system of claim 7 wherein said third outlet port communicates with a reservoir.

9. The system of claim 3 wherein the valve body includes a restrictor passage between said inlet port and said first outlet port to provide a constricted flow of fluid to the brake assist device and a corresponding elevation in pressure such that the flow of fluid to the brake assist is maintained at the brake assist control pressure and a fraction of the flow is constantly diverted to the steering assist device.

10. The system of claim 9 wherein the flow through the restriction causes the valve to move in the valve body to a position where said inlet port and said first outlet port are fully opened and said second outlet port is partially opened.

11. The system of claim 6 wherein the brake assist control pressure is about equal to the steering assist control pressure.

* * * * *